United States Patent [19]

Beck

[11] 4,173,558
[45] * Nov. 6, 1979

[54] NON-AQUEOUS POLYMERIC DISPERSION ALKYL METHACRYLATE COPOLYMERS IN MIXTURES OF ORGANIC SOLVENTS AND GLOSSY COATINGS PRODUCED THEREFROM

[75] Inventor: Charles K. Beck, Mentor, Ohio

[73] Assignee: AM International, Inc., Los Angeles, Calif.

[*] Notice: The portion of the term of this patent subsequent to Apr. 25, 1995, has been disclaimed.

[21] Appl. No.: 811,523

[22] Filed: Jun. 30, 1977

[51] Int. Cl.² .......................... C08F 2/14; C08L 33/08
[52] U.S. Cl. .............................. 260/33.4 R; 260/34.2; 428/463
[58] Field of Search ........................ 260/33.4 R, 34.2

[56] References Cited

U.S. PATENT DOCUMENTS

| | | | |
|---|---|---|---|
| 3,691,123 | 9/1972 | Clarke | 260/33.4 R |
| 3,740,367 | 6/1973 | Winkelblech | 260/33.4 R |
| 3,764,587 | 10/1973 | Zunker | 260/33.4 R |
| 3,823,205 | 7/1974 | Zimmt | 260/33.4 R |
| 3,875,140 | 4/1975 | Sheppard | 260/33.4 R |
| 3,875,262 | 4/1975 | Milne | 260/33.4 R |
| 3,893,960 | 7/1975 | Sheppard | 260/33.4 R |
| 3,900,453 | 8/1975 | Shimada et al. | 260/33.4 R |
| 3,926,899 | 12/1975 | Nordberg | 260/33.4 R |
| 4,086,202 | 4/1978 | Beck | 260/33.2 R |

FOREIGN PATENT DOCUMENTS 993794 6/1965 United Kingdom .

OTHER PUBLICATIONS

Chem. Abst. 082-12-073858p, Enclosed Jap. Pat. No. 49-81496.
"Dispersion Polym. In. Org. Media", Barrett Wiley-Inter., 1975, Chap. V.

*Primary Examiner*—Herbert J. Lilling
*Attorney, Agent, or Firm*—M. A. Kondzella; George Jameson

[57] ABSTRACT

A non-aqueous polymeric dispersion of a methacrylic polymer in a non-aqueous continuous phase comprised of a mixture of organic liquids, one of which is an alcohol, when applied to a suitable substrate, dries to produce a clear, glossy film.

13 Claims, No Drawings

NON-AQUEOUS POLYMERIC DISPERSION ALKYL METHACRYLATE COPOLYMERS IN MIXTURES OF ORGANIC SOLVENTS AND GLOSSY COATINGS PRODUCED THEREFROM

BACKGROUND OF THE INVENTION

This invention relates to glossy coatings. In one of its more particular aspects this invention relates to coatings prepared from non-aqueous dispersions of methacrylic polymers.

Methacrylic polymers such as polymers of lower alkyl methacrylates and copolymers thereof are widely used in a variety of coating applications. Aqueous emulsions of methacrylic polymers dry to produce generally glossy coatings and are used in emulsion paints. They are also used in heat-resistant and fumeproof enamels and in fluorescent coatings.

SUMMARY OF THE INVENTION

Glossy coatings, that is, coatings which reflect a large proportion of incident radiation in a specular direction, can be produced from non-aqueous dispersions of methacrylic polymers in which the continuous phase is a mixture of organic liquids, one of which is an alcohol.

DESCRIPTION OF THE PREFERRED EMBODIMENT

The dispersions of this invention can be prepared using a wide variety of methacrylic polymers. For example, polymethyl methacrylate and copolymers of methyl methacrylate and other lower alkyl methacrylates can be used. Especially preferred are copolymers of methyl methacrylate and ethyl methacrylate.

As the continuous phase a mixture of organic liquids, one of which is an alcohol, may be used. For example, mixtures of cyclohexane and ethanol wherein the cyclohexane and ethanol are present in a weight ratio falling in the range of about 3:1 to 1:3 have been found useful in producing the desired non-aqueous dispersions of this invention. Other organic liquids and mixtures thereof, for example, other alcohols, cycloaliphatics or ethers may also be used as the continuous phase or added in small quantities to achieve desired physicochemical properties or cost advantage.

In formulating the non-aqueous dispersions which dry to produce the desired coatings of this invention, the disperse phase is incorporated into the continuous phase by simple mixing. The ratio of disperse phase to continuous phase is not critical. However, above about 50% by weight solids content the viscosity of the dispersion may become undesirably high.

The non-aqueous dispersions of this invention find wide application in the preparation of a variety of glossy coatings. For example, the non-aqueous dispersions of this invention can be used in fluorescent coatings, pigmented or non-pigmented coatings, furniture finishes, coatings for airplanes or automobiles, primers for aluminum, surface seals, various laminates, antistatic coatings, water repellent coatings, aerosols, playing cards, artificial leathers, caulking bases, photoresists, conductivity changing indicators, protective layers and the like.

Some of the advantages of the dispersions of this invention are the fact that such dispersions are chemically stable and fast drying and display faster solvent release properties than normal coatings. The dispersions are capable of a high solids content at low viscosity. Upon drying the dispersions produce a glossy finish, which adheres to many different types of surfaces. In particular such coatings adhere very well to metals such as aluminum. If desired the gloss may be modified to any desired extent by well known means such as by the addition of dyes, pigments or mixtures thereof to provide any desired degree of opacity, color, semi-gloss finish or matte finish.

Another advantage of the dispersions of this invention resides in the particular materials used in the continuous phase which generally do not attack plastics or other soluble substrates. Therefore the dispersions of this invention can be used upon relatively soluble plastics such as vinyls. Another advantage of this invention is that since the continuous phase is not a solvent for the polymers comprising the disperse phase, recoating a surface which has been coated with a dispersion of this invention is easily accomplished without crosslinking the initial coat, and clean-up is easily accomplished by the use of relatively mild solvents such as toluene.

A further advantage of the dispersions of this invention is their ease of preparation. All that is necessary is to add the disperse phase to the continuous phase and mix the two phases until the disperse phase is thoroughly dispersed within the continuous phase. No particular conditions of pressure, temperature or relative humidity are required for preparing excellent dispersions in accordance with this invention.

Another advantage of this invention is that due to the fact that the disperse phase is constituted of relatively inexpensive commercially available polymers and the continuous phase is made up of inexpensive commercially available alcohols and other organic liquids and the preparation of the dispersions involves only limited expenditures for either labor or equipment, the dispersions of this invention have a decided economic advantage over products with which they may compete.

This invention will be better understood by reference to the following example which is intended for purposes of illustration and are not to be construed as limiting the scope of the instant invention which is defined in the claims appended hereto.

EXAMPLE 1

A mixture of 10 grams of ACRYLOID B 72, 100%, a copolymer of methyl methacrylate and ethyl methacrylate in a ratio by weight of 7:3 manufactured by Rohm and Haas Company, 45 grams of cyclohexane and 45 grams of denatured ethanol manufactured as Proprietary Solvent No. III (anhydrous) by U.S.I. Chemicals was mixed using a propeller mixer until the polymer was thoroughly dispersed in the liquid mixture. The continuous phase was made up of cyclohexane and ethanol in a ratio of 1:1. A coating of this dispersion upon an aluminized Mylar film dried to a clear, glossy finish.

Since the foregoing description is merely illustrative, the scope of protection of the invention has been more broadly stated in the following claims, and these should be liberally interpreted so as to obtain the benefits of all equivalence to which the invention is fairly entitled.

I claim:

1. A chemically stable non-aqueous dispersion which has the property of drying to a clear, glossy finish upon application to a surface which comprises a copolymer consisting of alkyl methacrylates and a mixture of organic liquids, one of which is an alcohol, said copolymer being the disperse phase and said organic liquid constituting the continuous phase of the non-aqueous dispersion, said mixture including substantially no solvent, and no other dispersant, for said copolymer.

2. A dispersion according to claim 1 wherein the disperse phase is a copolymer of methyl methacrylate and ethyl methacrylate.

3. A dispersion according to claim 1 wherein the continuous phase is a mixture of cyclohexane and ethanol in a weight ratio falling in the range of about 3:1 to 1:3.

4. A dispersion according to claim 1 wherein the continuous phase is a mixture of cyclohexane and ethanol in a weight ratio of about 1:1.

5. A clear, glossy coating produced by applying a dispersion according to claim 1 to a surface and allowing the dispersion to dry thereon.

6. A coating according to claim 5 which additionally contains a member selected from the group consisting of dyes, pigments and mixtures thereof.

7. A dispersion according to claim 1 wherein neither the continuous phase nor the disperse phase includes effective amounts of stabilizing substances.

8. The method comprising dispersing a copolymer consisting of alkyl methacrylates in a mixture of organic liquids, one of which is an alcohol, to form a chemically stable, non-aqueous dispersion in which said copolymer is the disperse phase and said mixture is the continuous phase, said mixture including substantially no solvent and no other dispersant for said copolymer.

9. The method according to claim 8 wherein the disperse phase is a copolymer consisting of methyl methacrylate and ethyl methacrylate.

10. The method according to claim 8 wherein the continuous phase is a mixture of cyclohexane and ethanol in a weight ratio falling in a range of about 3:1 to 1:3.

11. The method according to claim 10 wherein the ratio of cyclohexane to ethanol is about 1:1.

12. The method according to claim 8 further comprising applying said dispersion to a surface and allowing said dispersion to dry thereon.

13. The method according to claim 12 wherein the dispersion includes a member selected from the group consisting of dyes, pigments and mixtures thereof.

* * * * *